United States Patent [19]

Yanagase et al.

[11] Patent Number: 6,028,127

[45] Date of Patent: *Feb. 22, 2000

[54] ARTIFICIAL MARBLE AND METHOD FOR PREPARING IT

[75] Inventors: Akira Yanagase, Hiroshima; Hitoshi Ige, Toyama; Hiroyuki Watanabe; Shougo Okazaki, both of Hiroshima, all of Japan

[73] Assignee: Mitsubishi Rayon Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,094

[22] PCT Filed: Oct. 13, 1995

[86] PCT No.: PCT/JP95/02097

§ 371 Date: Apr. 14, 1997

§ 102(e) Date: Apr. 14, 1997

[87] PCT Pub. No.: WO96/11890

PCT Pub. Date: Apr. 25, 1996

[30] Foreign Application Priority Data

Oct. 14, 1994 [JP] Japan ..................... 6-249313
Feb. 13, 1995 [JP] Japan ..................... 7-024377

[51] Int. Cl.⁷ ........................................... C09D 5/29

[52] U.S. Cl. ............................ 523/171; 524/409; 524/430
[58] Field of Search ............................. 523/171; 524/409, 524/430

[56] References Cited

U.S. PATENT DOCUMENTS

| | | | |
|---|---|---|---|
| 4,061,614 | 12/1977 | Self | 260/40 |
| 4,159,301 | 6/1979 | Buser | 524/451 |
| 4,174,331 | 11/1979 | Myles | 524/34 |
| 5,346,767 | 9/1994 | Tilley | 428/412 |
| 5,648,407 | 7/1997 | Goetz | 524/409 |

*Primary Examiner*—Paul R. Michl
*Attorney, Agent, or Firm*—Oblon, Spivak, McClelland, Maier & Neustadt, P.C.

[57] ABSTRACT

An artificial marble is herein disclosed which comprises a polymer (A) of a radical polymerizable vinyl compound, an inorganic filler (B) having an average particle diameter of 1 $\mu$m or more, and a colloidal metal oxide (C) having an average particle diameter of 1 to 100 nm, the metal oxide (C) being uniformly dispersed in the state of substantially primary particles in the polymer (A). The colloidal metal oxide (C) can be uniformly dispersed, whereby a high flame retardancy can be imparted to the artificial marble, and the inorganic components can be filled in a higher ratio without impairing aesthetic properties peculiar to the artificial marble.

17 Claims, 2 Drawing Sheets

ARTIFICIAL MARBLE AND METHOD FOR PREPARING IT

TECHNICAL FIELD

The present invention relates to an artificial marble in which an inorganic filler such as aluminum hydroxide and a metal oxide such as colloidal silica are blended. More specifically, it relates to an artificial marble to which excellent incombustibility is imparted without impairing aesthetic properties (transparent feeling, shielding properties and surface appearance) inherent in the artificial marble and which is suitable for a building material.

BACKGROUND ART

The so-called artificial marbles prepared by blending a resin such as an acrylic resin or an unsaturated polyester resin with an inorganic filler such as aluminum hydroxide or magnesium hydroxide has not only aesthetic properties similar to those of a natural stone but also conveniences such as lightweight and a good workability, and for these reasons, the artificial marbles have rapidly been spread mainly as interior materials, particularly sanitary materials.

In these artificial marbles, an inorganic hydrate which can also function as a flame retardant is blended in a high ratio, and therefore they are recognized to be a flame-retardant material under the Building Standards Act in Japan. However, the artificial marbles cannot be used in places where the employment of an incombustible material or a semi-incombustible material is required.

For the purpose of solving this technical problem, there have been proposed an attempt at making the artificial marbles incombustible by combining aluminum hydroxide with a ground natural stone or another inorganic filler to blend the inorganic component in a high ratio and to relatively decrease a resin content (Japanese Patent Publication No. 30290/1977). Furthermore, there have been proposed a combination of aluminum hydroxide and α-cristobalite for the purpose of improving a balance between transparency and whiteness of a molded article (Japanese Patent Application Laid-open No. 226543/1985), a combination of aluminum hydroxide and fine silica particles (thermally decomposed silica) for the purpose of preventing the sedimentation of inorganic materials (Japanese Patent Application Laid-open No. 285854/1991), and a combination of a methacrylic resin, aluminum hydroxide and silica (quartz) for the purpose of improving workability and hot water resistance (Japanese Patent Application Laid-open No. 245661/1985).

In any of these prior arts, however, as for the other organic filler which is combined with the inorganic hydrate, its particle diameter has a micrometer order, or even if the particle diameter of its primary particles has a nanometer order, the inorganic filler has been used in a high cohesion state. In consequence, it has been impossible to simultaneously impart the high flame retardancy and the excellent aesthetic properties to the artificial marbles. In addition, if a large amount of the inorganic component is blended at the time of manufacture, the viscosity of the mixture excessively increases. Accordingly, it is practically difficult to blend the inorganic component in a high ratio.

Therefore, in the conventional techniques, it is difficult to impart the high flame retardancy to the artificial marbles, while the excellent aesthetic properties of the artificial marbles are maintained.

DISCLOSURE OF THE INVENTION

An object of the present invention is to provide an artificial marble to which a high flame retardancy is imparted without impairing aesthetic properties such as transparent feeling, shielding properties and surface appearance, which is peculiar to the artificial marble by blending an inorganic material in a high ratio, while its transparent feeling is maintained even when the inorganic material is blended in the high ratio.

The present inventors have intensively investigated in order to achieve the above object, and as a result, it has been found that the above object can be achieved by an artificial marble which comprises a combination of a radical polymerizable vinyl compound, colloidal metal oxide and an inorganic filler, and on the basis of this finding, the present invention has been attained.

That is to say, the first aspect of the present invention is directed to an artificial marble which comprises a polymer (A) of a radical polymerizable vinyl compound (a), an inorganic filler (B) having an average particle diameter of 1 μm or more, and a colloidal metal oxide (C) having an average particle diameter of 1 to 100 nm, the metal oxide (C) being uniformly dispersed in the state of substantially primary particles in the polymer.

The second aspect of the present invention is directed to a method for preparing an artificial marble which comprises the steps of hydrolyzing and polycondensing at least one silane compound (K) represented by the following formula (i) in a dispersion comprising a colloidal metal oxide (C) having an average particle diameter of 1 to 100 nm and a dispersing medium to modify the surfaces of the colloidal metal oxide (C), replacing the dispersing medium with a radical polymerizable vinyl compound (a), further adding an inorganic filler (B), and then polymerizing and curing the radical polymerizable vinyl compound (a):

$$SiR^1_a R^2_b (OR^3)_c \qquad (i)$$

wherein $R^1$ and $R^2$ each is a hydrocarbon group having 1 to 10 carbon atoms which may have an ether linkage, an ester linkage, an amino group, a mercapto group, a halogen atom or a carbon-carbon double bond; $R^3$ is a hydrogen atom or a hydrocarbon group having 1 to 10 carbon atoms which may have an ether linkage, an ester linkage or a carbon-carbon double bond; a and b each is an integer of 0 to 3; and c is 4-a-b and an integer of 1 to 4.

The third aspect of the present invention is directed to a method for preparing an artificial marble which comprises the steps of replacing a dispersing medium in a dispersion comprising a colloidal metal oxide (C) having an average particle diameter of 1 to 100 nm and the dispersing medium with a radical polymerizable vinyl compound (a) containing at least one selected from the group consisting of a radical polymerizable vinyl compound having one or more hydroxy groups in its molecule and a radical polymerizable vinyl compound having one or more epoxy groups capable of generating the hydroxy groups in its molecule, adding an inorganic filler (B), and then polymerizing and curing the radical polymerizable vinyl compound (a).

BEST MODE FOR CARRYING OUT THE INVENTION

A radical polymerizable vinyl compound (a) which can be used in the present invention is not particularly restricted, and various kinds of radical polymerizable monomers can be used. Typical examples of the radical polymerizable vinyl compound (a) include methacrylic acid esters such as methyl methacrylate and 2-ethylhexyl methacrylate; acrylic acid esters such as ethyl acrylate and butyl acrylate; unsaturated carboxylic acids such as acrylic acid and methacrylic acid; acid anhydrides such as maleic anhydride and itaconic anhydride; maleimide derivatives such as N-phenylmaleimide and N-cyclohexylmaleimide; hydroxy group-containing monomers such as 2-hydroxyethyl acrylate, 2-hydroxyethyl methacrylate and 2-hydroxypropyl methacrylate; vinyl esters such as vinyl acetate and vinyl benzoate; vinyl chloride, vinylidene chloride and derivatives thereof; nitrogen-containing monomers such as methacrylamide and acrylonitrile; epoxy group-containing monomers such as glycidyl acrylate and glycidyl methacrylate; aromatic compounds having an ethylenic unsaturated bond in a molecule such as styrene and α-methylstyrene; crosslinking agents having two or more ethylenic unsaturated bonds in a molecule such as ethylene glycol dimethacrylate, allyl acrylate, allyl methacrylate, divinylbenzene and trimethylolpropane triacrylate; unsaturated polyester prepolymers derived from at least one polyvalent carboxylic acid including an ethylenic unsaturated polycarboxylic acid and at least one diol; and vinyl ester prepolymers derived by acryl-modifying the terminal of an epoxy group.

Above all, the methacrylic acid esters are preferable, and methyl methacrylate is particularly preferable. In addition, a mixture of two or more kinds of compounds which are compatible and copolymerizable with each other can also be used. In this case, the content of at least one kind of monomer selected from the methacrylic acid esters is preferably 50% by weight or more, more preferably 70% by weight or more of all the compounds. Moreover, a polymer obtained by previously polymerizing a part of the monomer can also be used.

The content of the polymer (A) in an artificial marble (hereinafter referred to as "the molded article" on Goccasion) depends spontaneously on the desired characteristics of the molded article, but it is in the range of 15 to 60% by weight, preferably 15 to 50% by weight.

Furthermore, in order to exhibit a higher flame retardancy, a mixture of a vinyl chloride-vinylidene chloride copolymer (hereinafter referred to as "the VC-VDC copolymer") and a polymer composed mainly of methyl methacrylate (hereinafter referred to as "the PMMA polymer" on occasion) can be used as the polymer (A). In order to impart depth to the molded article, this mixture is required to be transparent or semitransparent, and it is most preferable that the mixture is transparent.

As the VC-VDC copolymer which can express such characteristics, there is a copolymer in which a vinyl chloride content in the copolymer is in the range of 50 to 80% by weight and an inherent viscosity measured at 30° C. in a tetrahydrofuran solvent is in the range of 0.1 to 1.0 dl/g, preferably 0.2 to 0.5 dl/g.

A content of the VC-VDC copolymer is in the range of 5 to 40% by weight, preferably 10 to 25% by weight based on the total weight of the polymer (A). If the content of this copolymer is too low, the higher flame retardancy cannot be obtained, and on the other hand, if it is too high, characteristics such as the heat resistance and weathering resistance of the molded article are inconveniently poor.

Furthermore, in the system using this VC-VDC copolymer, colloidal antimony oxide can be used as a colloidal metal oxide (C), so that the flame retardancy of the molded article can be further improved by a synergistic effect of both the components.

Similarly, in order to express the higher flame retardancy, the polymer (A) can be used in the form of a mixture of acrylonitrile-styrene copolymer (hereinafter referred to as "the AN-St copolymer") and the PMMA polymer. In order to impart the depth to the molded article, this mixture is required to be transparent or semitransparent, and it is most preferable that the mixture is transparent. In the AN-St copolymer having such characteristics, the content of acrylonitrile is in the range of 20 to 50 mol %.

The amount of the AN-St copolymer which is to be added to the PMMA polymer is in the range of 5 to 40% by weight, preferably 10 to 25% by weight based on the total weight of the polymer (A). If the amount of the AN-St copolymer to be added is too small, the flame retardancy can scarcely be improved, and on the other hand, if it is too large, the weathering resistance and the like of the molded article are inconveniently poor.

In addition, as the polymer (A), there can be used a copolymer which comprises two or more monomers selected from the group consisting of cyclohexyl methacrylate, methyl methacrylate, 2-ethylhexyl methacrylate and styrene and whose refractive index is in the range of 1.51 to 1.55 at room temperature, whereby the molded article possesses an increased transparent feeling and an onyx-like appearance, and the hygroscopicity of the polymer (A) also decreases, which can improve the durability of the molded article.

Similarly, as the polymer (A), there can be used a polymer of a composition which comprises 65 to 45% by weight (the total amount of the polymer (A) is regarded as 100% by weight) of a monomer mixture comprising 30 to 80% by weight of an aliphatic polyfunctional methacrylate such as trimethylolpropane trimethacrylate and 70 to 20% by weight of an aromatic compound such as styrene having an ethylenic unsaturated bond in a molecule, and 35 to 55% by weight (the total amount of the polymer (A) is regarded as 100% by weight) of an aromatic compound polymer such as polystyrene having an ethylenic unsaturated bond in a molecule, and a refractive index of the polymer is in the range of 1.55 to 1.57 at room temperature, whereby the molded article can possess a sufficient transparent feeling and onyx-like appearance. In this case, the molded article prepared by pressure molding is excellent in transparent feeling, water resistance and dimensional stability at curing.

Moreover, as the polymer (A), there can also be used a polymer obtained by curing a specific resin material and a specific partially crosslinked gel-like polymer, whereby the heat resistance of the molded article can be improved. An example of such a polymer (A) is a combination of 100 parts by weight of a resin material and 2 to 250 parts by weight of a partially crosslinked gel-like polymer. Here, the above resin material is selected from the group consisting of a methacrylic acid ester, an α,β-ethylenic unsaturated monomer mixture containing a methacrylic acid ester as a main component and a syrup containing a polymer thereof, and the above partially crosslinked gel-like polymer is obtainable by partially polymerizing a mixture comprising a crosslinking agent having at least two methacryloyl groups in a molecule so that the content of the polymer may be 4 to 65% by weight higher than the polymer content in the above mixture, so long as the total polymer content is not more than 80% by weight.

Furthermore, to this system can be added at least one acid selected from the group consisting of formic acid, oxalic acid, chloroacetic acid, malonic acid, citraconic acid, phthalic anhydride, succinic anhydride, fumaric acid, phthalic acid, malic acid and phosphoric acid in an amount of 0.15 to 1.5 parts by weight based on 100 parts by weight of the polymer (A), whereby the coloring of the molded article can be restrained.

In addition, as the polymer (A), there can also be used a copolymer comprising 40 to 95% by weight of a methacrylic acid ester containing 0.1 to 2% by weight of a crosslinking agent such as ethylene glycol dimethacrylate having two or more ethylenic unsaturated bonds in a molecule and containing methyl methacrylate as a main component, and 5 to 60% by weight of an aromatic compound such as styrene having an ethylenic unsaturated bond in a molecule, and in this case, the transparent feeling and boiling water resistance of the molded article can be improved.

Moreover, for the purpose of improving the impact resistance of the molded article, an elastomer such as an acrylic elastomer can be added to the polymer (A).

No particular restriction is put on an inorganic filler (B) which can be used in the present invention, and any inorganic filler can be used, so long as its average particle diameter is 1 $\mu$m or more and it is insoluble in the radical polymerizable vinyl compound (a) and it does not disturb the polymerization and curing of the vinyl compound (a). Examples of the inorganic filler (B) include aluminum hydroxide, magnesium hydroxide, calcium hydroxide, zirconium hydroxide, alumina, calcium carbonate, magnesium oxide, titanium oxide, barium sulfate, silica, quartz, talc, mica, clay, diatomaceous earth, gypsum, powdery glass, montmorillonite, bentonite, pyrophyllite, kaolin, powdery chalk, marble, limestone, asbestos, mullite, aluminum silicate, aluminum stearate, calcium silicate, hard gypsum, α-cristobalite, alumina white ($[Al_2SO_4(OH)_4 \cdot XH_2 \cdot O \cdot 2Al(OH)_3]_n$), ettringite, and a fine powder obtained by mixing clay with an inorganic substance capable of developing a color after calcination, calcining the mixture, and then grinding the calcined material. They can be used singly or in a combination of two or more thereof. In order to impart the flame retardancy and the aesthetic properties to the molded article, aluminum hydroxide or magnesium hydroxide is preferable, and aluminum hydroxide is more preferable.

An average particle diameter of the usable inorganic filler (B) is 1 $\mu$m or more. No particular restriction is put on the upper limit of the inorganic filler (B), but if the particle diameter of the inorganic filler (B) is too large, the particles of the inorganic filler (B) are unevenly dispersed, so that the particles inconveniently precipitate during the molding and curing of the mixture. Thus, the particle diameter of the inorganic filler (B) is in the range of 1 to 200 $\mu$m, preferably 1 to 100 $\mu$m, more preferably 1 to 80 $\mu$m.

The content of the inorganic filler (B) in the molded article depends spontaneously on aesthetic properties (transparent feeling, shielding properties and surface appearance), specific gravity, hardness, strength, heat resistance, flame retardancy, price and the like of the desired artificial marble, and the content of the inorganic filler (B) is in the range of 20 to 75% by weight, preferably 45 to 75% by weight. If the content of the inorganic filler (B) is too large, the excellent aesthetic properties peculiar to the artificial marble are lost, and properties such as strength also deteriorate unpreferably. On the other hand, if the content is too small, the excellent aesthetic properties peculiar to the artificial marble are similarly lost, and properties such as heat resistance and flame retardancy also deteriorate unpreferably.

The surfaces of the inorganic filler (B), prior to its use, can be previously treated with a silane coupling agent, a titanate coupling agent, an aluminum coupling agent or a stearic acid-containing surface treating agent. These treating agents are used singly or in a combination of two or more thereof.

If the alumina white ($[Al_2SO_4(OH)_4 \cdot XH_2 \cdot O2Al(OH)_3]_n$) is used as the inorganic filler (B), the molded article can possess the increased transparent feeling and the onyx-like appearance.

Furthermore, if the inorganic filler (B) is mixed with α-cristobalite and aluminium hydroxide both of which have a whiteness of 95 or more and an average particle diameter of 50 $\mu$m or less, whiteness and transparent feeling of the molded article can be improved.

As the inorganic filler (B), there can also be used a fine powder obtained by mixing clay with an inorganic substance capable of developing a color after calcination, calcining the mixture, and then grinding the calcined material.

The above-mentioned clay is a usual clay which contains clay minerals such as phyllosilicates, pyrophyllite, talc, a mica group, a montmorillonite group, vermiculite, a chlorite group, a kaolin group and inosilicates, and particularly preferable examples of the clay include agalmatolites such as pyrophyllite agalmatolites, kaolin agalmatolites and sericite agalmatolites.

Examples of the inorganic substance capable of developing the color after the calcination include the so-called inorganic pigments, simple substances such as iron, lead, copper, nickel, cobalt, chromium, manganese, vanadium, molybdenum, antimony, tungsten, mercury, gold and carbon, and oxides, hydroxides, carbonates, sulfides, chlorides, nitrates and sulfates thereof.

A mixing ratio of the above clay and inorganic substance as well as a calcination method can be suitably selected in compliance with a desired color of the fine powder. As the calcination method, a known method is applicable, and the calcination is usually carried out at a temperature of 900 to 1600° C. for a period of 12 to 24 hours. The thus calcined material is finely ground by a mill such as a ball mill or a roll mill to obtain a fine powder. The average particle diameter of the fine powder is preferably 50 $\mu$m or less, more preferably 20 $\mu$m or less.

As the colloidal metal oxide (C), a product in which Be the colloidal metal oxide (C) is uniformly dispersed in the state of substantially primary particles in a dispersing medium is commercially available or can be prepared and then used. Examples of the colloidal metal oxide include colloidal silica, colloidal antimony oxide, colloidal alumina, colloidal titania and colloidal zirconia. In consideration of a price, an availability and the characteristics of the molded article, colloidal silica, colloidal antimony oxide and colloidal alumina are preferable, and colloidal silica is most preferable.

No particular restriction is put on the dispersing medium for the colloidal metal oxide (C). Examples of the usable dispersing medium include water, alcohols such as methanol and isopropyl alcohol, cellosolves and dimethylacetamide. Above all, the alcohols, the cellosolves and water are particularly preferable.

The average particle diameter of the colloidal metal oxide (C) has an influence on the aesthetic properties (transparent feeling, shielding properties and surface appearance) of the desired artificial marble, and therefore it cannot be decided sweepingly, but it is usually selected in the range of 1 to 100 nm, more preferably 1 to 50 nm.

The content of the colloidal metal oxide (C) is concerned with the content of the inorganic filler (B), and it has an influence on the characteristics of the desired artificial marble, and therefore it cannot be decided sweepingly. Usually, the content of the colloidal metal oxide (C) is preferably selected in the range of 1 to 50% by weight based on the total weight of the artificial marble under conditions that the content of the polymer (A) is in the range of 15 to 60% by weight and the content of the inorganic filler (B) is in the range of 20 to 75% by weight, and it is more preferably selected in the range of 5 to 30% by weight under conditions that the content of the polymer (A) is in the range of 15 to 50% by weight and the content of the inorganic filler (B) is in the range of 45 to 75% by weight.

A particularly preferable blend ratio is such that the total of the inorganic filler (B) and the colloidal metal oxide (C) is in the range of 50 to 85% by weight and a weight ratio of (B)/(C) is in the range of 1.5 to 15, and such that the polymer (A) contains a polymer obtained by polymerizing at least one compound selected from the methacrylic acid esters, the amount of the polymer being 50% by weight or more based on the total weight of the polymer (A).

In the artificial marble of the present invention, it is an essential requirement that the colloidal metal oxide (C) having an average particle diameter of 1 to 100 nm is uniformly dispersed in the state of substantially primary particles in the polymer (A). That is to say, when the very fine colloidal metal oxide (C) is uniformly dispersed in the state of the stably substantially primary particles in the polymer without cohering, a higher flame retardancy or incombustibility can be imparted to the artificial marble by the use of small amount of the inorganic component, and the inorganic component can be contained in a higher ratio. In addition, the aesthetic properties (transparent feeling, shielding properties and surface appearance) peculiar to the artificial marble can be maintained.

In order to uniformly disperse the colloidal metal oxide (C) in the state of the stably substantially primary particles in the polymer (A) without any cohesion of the oxide (C), it is necessary that the colloidal metal oxide (C) should be uniformly dispersed in the state of the stably substantially primary particles in the radical polymerizable vinyl compound (a). For the achievement of such a constitution, the following two methods can be exemplified.

A first method comprises hydrolyzing and polycondensing at least one silane compound (K) represented by the following formula (i) in a uniform dispersion of a colloidal metal oxide (C) having an average particle diameter of 1 to 100 nm to modify the surfaces of the colloidal metal oxide particles with the resulting reaction product, and then replacing a dispersing medium of the metal oxide with the radical polymerizable vinyl compound (a):

$$SiR^1_aR^2_b(OR^3)_c \qquad (i)$$

wherein $R^1$ and $R^2$ each is a hydrocarbon group having 1 to 10 carbon atoms which may have an ether linkage, an ester linkage, an amino group, a mercapto group, a halogen atom or a carbon-carbon double bond; $R^3$ is a hydrogen atom or a hydrocarbon group having 1 to 10 carbon atoms which may have an ether linkage, an ester linkage or a carbon-carbon double bond; a and b each is an integer of 0 to 3; and c is 4-a-b and an integer of 1 to 4.

A second method comprises replacing a dispersing medium in a uniform dispersion containing the colloidal metal oxide (C) having an average particle diameter of 1 to 100 nm with the radical polymerizable vinyl compound (a) containing at least one selected from the group consisting of a radical polymerizable vinyl compound having one or more hydroxy groups in its molecule and a radical polymerizable vinyl compound having one or more epoxy groups capable of generating the hydroxy groups in its molecule.

In the first method, in the uniform dispersion of the colloidal metal oxide (C) having an average particle diameter of 1 to 100 nm, most of an $OR^3$ group of at least one silane compound (K) represented by the above formula (i) is hydrolyzed. It can be presumed that a silanol group formed by the hydrolysis of this silane compound (K), or a silanol group of a polycondensate produced by the polycondensation of the silanol groups is polycondensed with an OH group on the surface of the colloidal metal oxide (C), so that the colloidal metal oxide (C) is covered (modified) awith the reaction product of the above silane compound (K), with the result that the surface of the colloidal metal oxide (C) is made hydrophobic. As a result, the colloidal metal oxide (C) having an average particle diameter of 1 to 100 nm can be uniformly dispersed in the state of the substantially primary particles in the radical polymerizable vinyl compound (a).

Typical examples of the silane compound (K) represented by the above formula (i) include tetramethoxysilane, tetraethoxysilane, methyltrimethoxysilane, ethyltrimethoxysilane, phenyltrimethoxysilane, dimethyldimethoxysilane, trimethylmethoxysilane, trimethylethoxysilane, methyltriacetoxysilane, tetrakis(acryloyloxyethoxy)silane, tetrakis(methacryloyloxyethoxy)silane, β-acryloyloxyethyldimethoxysilane, γ-acryloyloxypropylmethoxydimethylsilane, γ-acryloyloxypropyltrimethoxysilane, β-methacryloyloxyethyldimethoxymethylsilane, γ-methacryloyloxypropylmethoxydimethylsilane, γ-methacryloyloxypropyltrimethoxysilane, vinylmethyldimethoxysilane, vinyltrimethoxysilane, vinyltriethoxysilane, γ-aminopropyltrimethoxysilane, γ-aminopropyltriethoxysilane, γ-mercaptopropyldimethoxymethylsilane, γ-mercaptopropyltrimethoxysilane, p-vinylphenylmethyldimethoxysilane, p-vinylphenyltrimethoxysilane, γ-glycidoxypropyltrimethoxysilane and γ-chloropropyltrimethoxysilane.

Examples of the usable silane compound capable of producing the silanol group by the hydrolysis as the above alkoxysilane compounds include halogenated silane compounds such as trimethylchlorosilane, dimethyldichlorosilane, methyltrichlorosilane and phenyltrichlorosilane. Furthermore, it should be understood that the employment of the compound such as trimethylsilanol, triphenylsilanol or methylsilanetriol having one or more silanol groups in a molecule is also within the technical scope of the present invention.

When at least one selected from these silane compounds is used, there can be obtained the metal oxide modified with a reaction product formed by the hydrolysis of the silane compound and the polycondensation (hereinafter referred to as "the surface modified metal oxide"). The silane compounds can be used in a combination of two or more thereof in compliance with a use purpose, and in this case, the selected two or more silane compounds may all be mixed, hydrolyzed, and then polycondensed, or alternatively, the two or more silane compounds may be stepwise added one by one, hydrolyzed, and then polycondensed. In the case that the two or more silane compounds are used in combination, if at least one of the two or more silane compounds is changed into a reactive silane compound capable of forming a chemical linkage by the reaction at the time of the polymerization with the radical polymerizable vinyl compound (a) like y-methacryloyloxypropyltrimethoxysilane, the mechanical strength of the molded article can be improved.

An important point of the first method is that when the dispersing medium of the surface modified metal oxide is completely replaced with the radical polymerizable vinyl compound (a), the surface modified metal oxide should be substantially uniformly dispersed in the state of the primary particles in the vinyl compound (a), as in the case of the metal oxide (C).

During the hydrolysis and the polycondensation reaction of the silane compound (K), it is preferable that water is present in the reaction system. In general, the influence of water present in the reaction system on a reaction rate is not particularly noticeable, but in the case that the amount of existing water is extremely small, the hydrolysis is too slow, so that the production of the polycondensate is difficult.

As a catalyst for use in the hydrolytic reaction of the silane compound (K), there can be used an inorganic acid or an organic acid. Examples of the inorganic acid include hydrochloric acid, halogenated hydroacids such as hydrofluoric acid and hydrobromic acid, sulfuric acid, nitric acid and phosphoric acid. Furthermore, examples of the organic acid include formic acid, acetic acid, oxalic acid, acrylic acid and methacrylic acid.

In the hydrolytic reaction system of the silane compound (K), a solvent can be used in order to moderately and uniformly carry out the reaction. The desirable solvent allows the silane compound as a reactant to be compatible with water and the catalyst. Examples of the solvent include water, alcohols such as ethyl alcohol and isopropyl alcohol, ketones such as acetone and methyl isobutyl ketone, and ethers such as tetrahydrofuran and dioxane. As the solvent, the dispersing medium of the colloidal metal oxide (C) may be used as it is, or a required amount of the solvent may be newly added. No particular restriction is put on the amount of the solvent, any amount is acceptable, so long as it permits the uniform dissolution of the reactant, but if the concentration of the reactant is too dilute, the reaction rate is liable to be noticeably low. The hydrolysis and the polycondensation reaction of the silane compound (K) are carried out at a temperature of room temperature to about 120° C. for a period of 30 minutes to 24 hours, preferably at a temperature of room temperature to a boiling point of the solvent for a period of 1 to 10 hours.

Ad No particular restriction is put on a blend ratio between the metal oxide (C) and the silane compound (K) represented by the above formula (i), but the amount of the silane compound (K) is preferably in the range of 0.1 to 2000 parts by weight, more preferably 1 to 1000 parts by weight based on 100 parts by weight of a solid content of the colloidal metal oxide (C).

A technique for replacing the dispersing medium of the thus obtained dispersion of the surface modified metal oxide with the radical polymerizable vinyl compound (a) is not particularly restricted, but there are a method which comprises directly mixing the dispersion containing the uniformly dispersed colloidal surface modified metal oxide with the radical polymerizable vinyl compound (a), and then removing the dispersing medium and water from the mixed solution, and a method which comprises adding the radical polymerizable vinyl compound (a), while the dispersing medium containing the surface modified metal oxide dispersed therein and water are removed. In either case, it is necessary to replace the dispersing medium with the vinyl compound (a) under conditions that the colloidal surface modified metal oxide is not allowed to precipitate in the form of a solid.

On the other hand, the above second method comprises uniformly dispersing the colloidal metal oxide (C) in the radical polymerizable vinyl compound (a) without doing any specific treatment by using a specific radical polymerizable vinyl compound as the radical polymerizable vinyl compound (a).

Such a specific radical polymerizable vinyl compound is a compound which has one or more hydroxyl groups in a molecule and which is copolymerizable with the other radical polymerizable vinyl compound (a) and which is compatible with the dispersing medium in which the colloidal metal oxide (C) is uniformly dispersed in the state of the substantially primary particles. Typical examples of the specific radical polymerizable vinyl compound include 2-hyroxyethyl acrylate, 2-hyroxyethyl methacrylate, 2-hyroxypropyl acrylate and 2-hyroxypropyl methacrylate. In addition, a radical polymerizable vinyl compound having one or more epoxy groups capable of easily generating hydroxy groups by ring opening in its molecule can also be used. Its typical examples include glycidyl acrylate and glycidyl methacrylate.

These specific radical polymerizable vinyl compounds can be used singly or in the form of a mixture of two or more thereof in an amount of 0.1 to 100% by weight based on the weight of the polymer (A) of the radical polymerizable vinyl compound (a), whereby the colloidal metal oxide (C) can be uniformly dispersed in the state of the substantially primary particles in the vinyl compound (a) without cohesion and the formation of a network structure.

Also in the case of this second method, the dispersing medium can be replaced with the vinyl compound (a) without precipitating the colloidal metal oxide (C) in the state of a solid in the same manner as in the case of the first method.

No particular restriction is put on a molding, polymerization and curing method of the radical polymerizable vinyl compound (a) for obtaining the artificial marble of the present invention, and a cast molding method, a press molding method, an injection molding method, an extrusion method and the like can be applied. In particular, by the utilization of the characteristics that the colloidal metal oxide (C) is uniformly dispersed in the state of the substantially primary particles in the polymer (A) as described above and so the viscosity of the material does not increase even when the total inorganic component is blended with the mixture for the artificial marble in a high ratio, the artificial marble can be prepared from a casting material, i.e., a mixture comprising the three components (A), (B) and (C) or a mixture comprising the three components and other additives by directly using the cast molding method which has often been used as a conventional manufacturing method of the artificial marble.

In addition, the mixture comprising the three components (A), (B) and (C), or the mixture comprising the three components and other additives can be subjected to a suitable thickening treatment or a partial polymerization curing reaction to obtain masses which are suitably viscous, free from stickiness and excellent in handling properties, and for such masses, an optional heatingpress molding method such as the press molding method, the injection molding method, the extrusion method or a transfer molding method can be used.

If the cast molding method is taken as an example, the dispersion in which the colloidal metal oxide (C) or the surface modified metal oxide is uniformly dispersed in the state of the substantially primary particles in the radical polymerizable vinyl compound (a) is first prepared by the first method or the second method described above, and a radical polymerization initiator is then dissolved in the dispersion. Next, the inorganic filler (B) is dispersed therein to obtain the casting material, and this casting material is then polymerized and cured.

As the radical polymerization initiator which can be used herein, a usual radical polymerization initiator can be used in an amount of 0.001 to 2% by weight based on the weight of the polymer (A). Examples of the radical polymerization initiator include azo compounds such as 2,2'-azobis (isobutylonitrile) and 2,2'-azobis(2,4-dimethylvaleronitrile), an organic peroxide such as benzoyl peroxide, lauroyl peroxide, and redox polymerization initiators, and they can be used singly or in a combination thereof. In the case that the polymerization initiator is the organic peroxide, a tertiary amine can be used as a polymerization promotor. Furthermore, for example, there can also be used a mixture of a hemiperester of maleic acid obtained by reacting a saturated tertiary alkylperoxymalic acid such as t-butylperoxymaleic acid with a basic metal compound, water as the polymerization promotor, a mercaptan compound such as ethylene glycol dimercaptoacetate, and a sulfur activator which is an oxo acid salt of sulfur or a sulfate. The polymerization initiator can be suitably selected from the above examples in consideration of polymerization curing conditions (temperature, time, cost and the like) desired by a manufacturer.

The casting material can be molded by a method which comprises casting the casting material between two confronted inorganic glass plates or metallic plates whose peripheries are sealed with a gasket, and then heating it (a cell cast method), or by another method which comprises continuously casting the casting material into a space defined by two metallic endless belts movable in one direction at a constant speed and a gasket sealing these belts, or a space defined by one metallic endless belt and one resin film and a gasket sealing them from the upstream side of the space, then heating it (a continuous cast method). In this case, in view of release properties, aesthetic properties and the like of the molded article, the surfaces of the inorganic glass plates or the metallic plates can be covered with a resin film such as a polyvinyl alcohol or a polyester, prior to the molding.

Furthermore, an acid such as formic acid or acetic acid can be added to the casting material for the cast molding, the amount of the acid being in the range of 0.001 to 5% by weight based on the weight of the molded article, whereby the unevenness of a color among the lots of the products can be eliminated.

In addition, a prepolymer of methyl methacrylate having a molecular weight of 20000 to 70000 can be added to the radical polymerizable vinyl compound (a) so that the prepolymer may be present in a ratio of 35 to 55% by weight based on the weight of the polymer (A), whereby a film of the methyl methacrylate prepolymer is formed on the open surface of the molded article at an early stage of the curing to restrain the volatilization of the vinyl compound (a) monomer, which permits the preparation of the molded article by an open type cast molding method.

Moreover, an alkyl acid phosphate [formula $(C_nH_{2n+1}O)_mP(O)(OH)_{3-m}$, wherein n is an integer of 8 to 13, and m is 1 or 2] can be added to the casting material for the cast molding, the amount of the alkyl acid phosphate being in the range of 0.1 to 5% by weight based on the weight of the molded article, whereby the release properties can be improved.

With regard to the press molding method, the injection molding method and the transfer molding method, various instruments which have usually been used in each method can be used. In compliance with the shape of a mold for the molded article and the physical properties of the mixture for the artificial marble to be used, a molding temperature can be selected within the range of 90 to 180° C., preferably 100 to 150° C.; a molding pressure can be selected within the range of 20 to 500 kg/cm$^2$, preferably 20 to 250 kg/cm$^2$; and a molding time can be selected within the range of 1 to 30 minutes, preferably 2 to 20 minutes. Since volume shrinkage occurs during the polymerization, the mold to be used preferably has a structure by which the volume of a cavity can be reduced in a thickness direction with the volume shrinkage.

Furthermore, fine resin particles which is insoluble in the monomer (a) and which has swell characteristics can be added to the molding material which is the mixture of the three components (A), (B) and (C), whereby the stickiness of the molding material can be restrained, and an excellent transparent feeling and mirror transfer properties can be imparted to the molded article.

As a polymerization initiator, a combination of a radical polymerization initiator having a 10 hours' half-value period temperature of 50° C. or less and a radical polymerization initiator having a 10 hours' half-value period temperature of 70° C. or more can be used, whereby the handling properties of the molding material as well as the heat resistance and the chemical resistance of the molded article can be improved, and surface defects such as sink marks and fiber show can also be inhibited.

A hydroxyl group-containing polymethyl methacrylate copolymer which contains 2-hydroxyethyl methacrylate or the like as a copolymerizable component, and a polyisocyanate can be added to the polymer (A), whereby weathering resistance and ultraviolet light resistance can be imparted to the molded article, and the generation of cracks can also be suppressed.

A thermoplastic polymer which is less soluble in the vinyl compound (a) and which has an average molecular weight of about $28 \times 10^4$ can be added to the vinyl compound (a), whereby the shrinkage during the heating and curing can also be restrained.

Furthermore, a fine powder of a crosslinked polymer obtained by subjecting a methacrylic monomer to emulsion polymerization can be added to the vinyl compound (a), whereby water resistance can be imparted to the molded article and the generation of cracks can also be suppressed.

In preparing the artificial marble of the present invention by any of the various preparation methods, known additives such as a flame retardant, a colorant and a reinforcement can be mixed with the molding material, so long as they do not impair the effect of the present invention.

For the purpose of imparting a higher flame retardancy to the artificial marble, such a flame retardant (D) as to be usually used can be further added. The flame retardant (D) is a flame retardant which has usually been used to make plastic materials flame-retardant, and examples of the flame retardant include chlorine-containing flame retardants such as perchlorocyclopentadecane, chlorendic acid, chlorinated paraffins, chlorinated polyethylenes and vinyl chloride resins, bromine-containing flame retardants such as decabromodiphenyl oxide, tetrabromobisphenol-A and polydibromophenylene oxides, phosphorus containing flame retardants such as phosphoric acid esters and red phosphorus, and inorganic flame retardants such as nitrogenized guanidines and zinc borate.

Furthermore, in order to meet the demands of users, it is preferable to supply the artificial marbles having many colors, and in this case, the molded articles are required to be colored without impairing the aesthetic properties (transparent feeling, shielding properties and surface appearance) peculiar to the artificial marble. As a colorant for this coloring, an iron oxide pigment (E) having an average particle diameter of 10 µm or less may be used in an amount enough to impart a desired color to the artificial marble. If the particle diameter is in excess of 10 µm, the molded article having the desired characteristics cannot be obtained sometimes. This iron oxide pigment (E) may be sufficiently dispersed in a suitable dispersant such as a soybean oil epoxide resin, and then added to the polymerizable mixture comprising the polymer (A), the inorganic filler (B) and the colloidal metal oxide (C), prior to the curing of the mixture.

Another example of the colorant is a colorant (F) obtained by coloring a short fiber such as a nylon, an aramid, a polyacrylonitrile, a polyester, a polyolefin or a natural fiber having a high strength and an excellent weathering resistance with a dye or a pigment so as to develop a desired color.

The amount of the colored short fiber (F) in the molded article is in the range of 0.01 to 2% by weight, preferably 0.05 to 1% by weight based on the weight of the molded article, and the fiber length of the colored short fiber (F) is in the range of 0.2 to 13 mm, preferably 0.2 to 3.5 mm. However, longer fiber, for example, the fiber having a fiber length of about 25 mm or less, can also be added. The fineness of the colored short fiber (F) is preferably in the range of 1 to 300 denier, more preferably 1 to 48 denier.

Particularly in the case that a black spot pattern is to be imparted to the molded article, black carbon particles (G) such as coal, coke, charcoal, activated carbon, carbon black or amorphous carbon can be used, and active carbon is particularly preferable.

No particular restriction is put on the shape of the carbon particles (G), but in order to uniform the black spot pattern in the molded article, its shape is such that a ratio of the maximum width to the minimum width of the carbon particles is 7 or less, preferably 5 or less, more preferably 3 or less.

The size and the amount of the carbon particles (G) are concerned with the desired characteristics of the molded article, and so they cannot be decided sweepingly, but if the size of the carbon particles (G) is too small, they cannot be visually recognized as the black spots. Therefore, the maximum width of the carbon particles (G) is 0.05 mm or more, preferably 0.1 mm or more, more preferably 0.15 mm or more. The amount of the carbon particles (G) to be added is in the range of 0.01 to 10% by weight, preferably 0.1 to 5% by weight based on the total weight of the molded article. If the amount of the carbon particles (G) to be added is too small, the number of the black spots is small, so that the spot pattern is unclear, and on the other hand, if the amount of the carbon particles (G) is too large, the whole of the molded article is uniformly colored black unpreferably.

In the case that a granite-like pattern is to be imparted to the molded article, there can be further added, to the artificial marble of the present invention, opaque particles (H) in which a shortest length is 200 µm or more and an optical density to visible light is 2.0 or more, and at least one kind of particles (I) selected from the group consisting of semitransparent particles in which a shortest length is 200 µm or more and an optical density to visible light is in the range of 2.0 to 0.1 and/or transparent particles in which an optical density is less than 0.1.

Here, the optical density is a value obtained by measuring transparencies G, R and B with a spectrophotometer at a time when a visible light in the wavelength range of 400 to 800 nm is transmitted through a sample having a thickness of 0.24 mm, and then doing calculation in accordance with the following equation $$\text{optical density} = \log_{10}(I_i/I_t)$$

wherein Ii is an intensity of an incident light, and It is an intensity of a transmitted light.

The minimum size of both the particles (H) and (I) is 200 µm or more, preferably 250 µm or more, and most preferably, the minimum, average and maximum particle sizes of the particles are in the range of 250 to 5000 µm. However, for the sake of a certain aesthetic effect, the particles having the maximum size much larger than 5000 µm, for example, a maximum size of 6 to 13 mm or more can be allowed to be present in the artificial marble. In this case, however, the size of the particles is required to be such that the maximum particles do not precipitate in the molded article to prevent the noticeable deformation of the molded article.

Examples of the opaque particles (H) include calcined talc, magnetite, goethite and anthracite. In addition, there can also be used chips obtained by adding an optional filler or pigment to an optional insoluble or cross-linked polymer such as a polypropylene, a phenolic resin, an acrylic resin or a polyvinyl ester.

On the other hand, examples of the usable semitransparent particles and/or transparent particles (I) include natural and synthetic minerals such as lapis lazuli, mica and wollastonite, and chips obtained by adding a pigment or a dye to an insoluble or cross-linked polymer.

The amount of the opaque particles (H), the semitransparent particles and/or the transparent particles (I) is preferably in the range of 1 to 25% by weight based on the total weight of the molded article, and the amount of the opaque particles (H) is more preferably in the range of 5 to 15% by weight and the amount of the semitransparent particles and/or the transparent particles (I) is more preferably in the range of 5 to 15% by weight.

Furthermore, in the case that a natural stone-like pattern (a rift-like pattern) is to be similarly imparted to the molded article, substantially transparent particles (J) comprising a resin composition and an inorganic filler can be further added to the artificial marble of the present invention.

Here, the expression "substantially transparent" means that an aesthetic transparent feeling is given to the particles (J), but its preferable state is such that a value of a parallel light transmittance of a sheet having a thickness of 2 mm as measured by a measuring procedure A in accordance with JIS K-7105 is 8% or more, more preferably 10% or more.

One example of the resin composition for the transparent particles (J) is a copolymer of an unsaturated polyester and styrene. The unsaturated polyester can be produced by a polycondensation reaction of an unsaturated dicarboxylic acid such as maleic acid or fumaric acid with a glycol such as ethylene glycol or diethylene glycol. The other preferable examples of the resin composition include polybenzyl methacrylate and a polymer containing benzyl methacrylate as a main constitutional unit. Preferable examples of the compound which can be copolymerized with benzyl methacrylate include compounds such as methacrylic acid esters other than benzyl methacrylate, styrene and ethylene glycol dimethacrylate each of which has a plurality of polymerizable double bonds in a molecule. Above all, more preferable are a copolymer of 50 to 70% by weight of an unsaturated polyester and 30 to 50% by weight of styrene, and a copolymer of 90 to 99.9% by weight of benzyl methacrylate and 0.1 to 10% by weight of a compound such as ethylene glycol dimethacrylate having a plurality of polymerizable double bonds in a molecule.

On the other hand, examples of the inorganic filler which can be added to the transparent particles (J) include aluminum hydroxide, calcium hydroxide, magnesium hydroxide, powdery talc, powdery quartz, fine silica, diatomaceous earth, gypsum, powdery glass, clay minerals, powdery chalk, marble, limestone, asbestos, aluminum silicate, aluminum stearate, mullite, calcium silicate and hard gypsum. Above all, aluminum hydroxide, calcium hydroxide and magnesium hydroxide are preferable, and aluminum hydroxide is more preferable. These hydroxides release crystal water at a high temperature, and so they particularly effectively function to improve the flame retardancy of the artificial marble.

The particle diameter of this inorganic filler has an influence on the light transmission properties of the transparent particles (J) and a viscosity rise at the time of the mixing with a polymerizable resin material, and therefore the particle diameter of the inorganic filler is preferably in the range of 1 to 150 μm, and a central particle diameter of the particle diameter distribution of the inorganic filler is suitably in the range of 10 to 100 μm.

With regard to the amount of the inorganic filler to be added, an excessive amount of the inorganic filler gives rise to the strength deterioration of the transparent particles (J) and also easily brings about the deterioration of the transparency. Therefore, the amount of the inorganic filler in the transparent particles (J) is preferably in the range of 40 to 85% by weight based on the weight of the transparent particles (J). In addition, the inorganic filler having the surfaces treated with a silane coupling agent or a stearic acid surface treatment agent can also be similarly handled.

To the transparent particles (J), various additives other than the inorganic filler may be added. Examples of such additives include a colorant such as a pigment or a dye, an ultraviolet light absorber, a flame retardant, a mold release agent and a thickening agent.

The transparent particles (J) preferably have a controlled quantity of charged static electricity in consideration of a fact that static electricity is generated during a delivery step or a grinding step of the particles, so that the adhesion and cohesion of the particles, contamination with foreign substances and the like occur, and a discharge phenomenon might take place to bring about a dust explosion.

As the transparent particles (J) are large, the appearance of the product is close to the natural stone, but the employment of the large transparent particles (J) makes the preparation process of the artificial marble difficult. That is to say, in the case that the surface of the artificial marble containing the dispersed transparent particles (J) is ground as deep as the half of a particle diameter, the transparent particles (J) appear on the surface of the artificial marble, and in consequence, a more preferable appearance can be obtained. Therefore, the smaller the size of the particles (J) is, the easier the grinding is. Thus, the size of the particles (J) is preferably in the range of 0.2 to 5 mm.

As techniques for preparing the particles (J), there are a method which comprises uniformly dispersing the inorganic filler in the polymerizable resin material, bulk-polymerizing it, and then grinding the resulting polymer by a grinder, and a method which comprises uniformly dispersing the inorganic filler in the polymerizable resin material, and then suspension-polymerizing it in an aqueous medium. Above all, the former method is preferable.

The amount of the transparent particles (J) to be added is preferably in the range of 1 to 25% by weight based on the total weight of the molded article.

Furthermore, for the purpose of imparting impact resistance to the molded article, a glass fiber filler can be used together, but in this case, much attention should be paid to a possibility that the aesthetic properties of the molded article might be lost.

Moreover, various additives such as a flame retardant, a colorant, a reinforcement, an ultraviolet light absorber, a heat stabilizer and a mold release agent other than mentioned above can be added to the artificial marble of the present invention in compliance with a use purpose.

The artificial marble of the present invention has a high flame-retardant performance, and therefore, it can be applied to interior and exterior materials of buildings. In addition, the artificial marble can be applied to conventional known uses of the artificial marble, for example, sanitary utensils such as kitchen counter tables, cabinet panels, desk tops, bar counter tops, cupboard panels, washbowls, wash tops, bath units and toilet units, and living utensils such as washstands, living tables, closet panels and furniture tops.

Next, the present invention will be described in more detail with reference to examples. In the examples, "part(s)" means "part(s) by weight", unless otherwise specified.

Here, flame retardancy was evaluated by measuring an oxygen index of a sheet having a thickness of 3 mm in accordance with JIS K-7201. Aesthetic properties were visually evaluated.

EXAMPLE 1

In a glass flask equipped with stirring blades were placed 5 parts of trimethylmethoxysilane and 200 parts of colloidal silica-dispersing isopropyl alcohol (average particle diameter=about 15 nm, silica content=30% by weight, trade name IPA-ST, made by Nissan Chemical Industries, Ltd.), and 5 parts of a 0.1 N aqueous hydrochloric acid solution was then added with stirring, followed by heating the solution up to 50° C. After 2 hours, while volatiles were distilled off at 40° C. under reduced pressure by a rotary evaporator, methyl methacrylate (hereinafter abbreviated to "MMA") was added at the same rate as in the distillation of the volatiles, and finally, the dispersing medium was completely replaced with MMA to bring the total amount into 120 parts. In the thus obtained colloidal silica dispersion, surface modified colloidal silica was uniformly dispersed in the state of the substantially primary particles in MMA, so that the colloidal silica dispersion was transparent and its viscosity scarcely rose. Furthermore, this dispersion was burnt in a crucible, and on the basis of the resulting ash, a silica content was then calculated and it was 52% by weight.

In 100 parts of this dispersion, 0.25 part of 2,2'-azobis(2, 4-dimethylvaleronitrile) (hereinafter abbreviated to "AVN") was dissolved, and 150 parts of aluminum hydroxide (average particle diameter=44 μm, trade name BW-33, made by Nippon Light Metal Co., Ltd.) was added and then mixed by a stirrer to prepare a casting material. In this casting material, 21% by weight of a silica solid and 60% by weight of aluminum hydroxide (hereinafter abbreviated to "ATH") were blended.

The thus prepared casting material was exposed to a reduced pressure to remove dissolved air, and it was then poured into a cell which was formed by a gasket and two stainless steel plates (whose surfaces were covered with a polyester film) and whose thickness was previously set to 3 mm. Afterward, polymerization was carried out at 80° C. for 2 hours and at 130° C. for 2 hours to mold a desired artificial marble.

An extremely thin slice of the thus obtained artificial marble was observed through a transmission electron microscope, and as a result, it was confirmed that the colloidal silica was uniformly dispersed. This artificial marble was excellent in both of transparent feeling and depth, and it assumed a beautiful surface appearance, which meant that it was excellent in aesthetic properties. In addition, an oxygen index of the artificial marble was 90 or more (which was more than a measurable upper limit), which meant that the artificial marble was very excellent in flame retardancy. According to a flame retardancy test procedure (a surface test) of No. 1231 (flame-retardant materials) notified by Ministry of Construction in Japan, the test results in Table 1 were obtained.

EXAMPLE 2

To 100 parts of a 52% surface modified colloidal silica-dispersing MMA solution prepared by the same procedure as in Example 1 were added newly 50 parts of MMA and 50 parts of an MMA syrup preliminarily polymerized up to a polymerization ratio of 20%, and 0.5 part of AVN was dissolved in the solution. Afterward, 300 parts of ATH was added and then mixed by a stirrer to prepare a casting material. In this casting material, 10% by weight of a silica solid and 60% by weight of ATH were blended. The other operations were carried out in the same manner as in Example 1 to mold an artificial marble.

An extremely thin slice of the thus obtained artificial marble was observed through a transmission electron microscope, and as a result, it was confirmed that the colloidal silica was uniformly dispersed. This artificial marble was excellent in both of transparent feeling and depth, and it assumed a beautiful surface appearance, which meant that it was excellent in aesthetic properties. In addition, an oxygen index of the artificial marble was 52, which meant that the artificial marble was excellent in flame retardancy. According to a flame retardancy test procedure (a surface test) of No. 1231 (flame-retardant materials) notified by Ministry of Construction in Japan, the test results in Table 1 were obtained.

water and 0.1 part of 36% by weight hydrochloric acid were then added with stirring, followed by heating the solution up to 70° C. After 2 hours, while volatiles were distilled off at 40° C. under reduced pressure by a rotary evaporator, MMA was added at the same rate as in the distillation of the volatiles, and finally, the dispersing medium was completely replaced with MMA to bring the total amount into 360 parts. In the thus obtained colloidal silica dispersion, surface modified colloidal silica was uniformly dispersed in the state of the substantially primary particles in MMA, so that the colloidal silica dispersion was transparent and its viscosity scarcely rose. Furthermore, this dispersion was burnt in a crucible, and on the basis of the resulting ash, a silica content was then calculated and it was 21% by weight.

In 100 parts of this dispersion, 0.16 part of 2,2'-azobis (isobutyronitrile) was dissolved, and 150 parts of ATH (average particle diameter=24 μm, trade name Hydilite H-210, made by Showa Denko K. K.) was added and then mixed by a stirrer to prepare a casting material. In this casting material, 8% by weight of a silica solid and 60% by weight of ATH were blended.

The thus prepared casting material was exposed to a reduced pressure to remove dissolved air, and it was then poured into a cell which was formed by a gasket and two stainless steel plates and whose thickness was previously set to 3 mm. Afterward, polymerization was carried out at 80° C. for 2 hours and at 130° C. for 2 hours to mold a desired artificial marble. The thus obtained artificial marble was excellent in both of transparent feeling and depth, and it assumed a beautiful surface appearance, which meant that it was excellent in aesthetic properties. In addition, an oxygen index of the artificial marble was 48, which meant that the artificial marble was excellent in flame retardancy.

Figure 1:
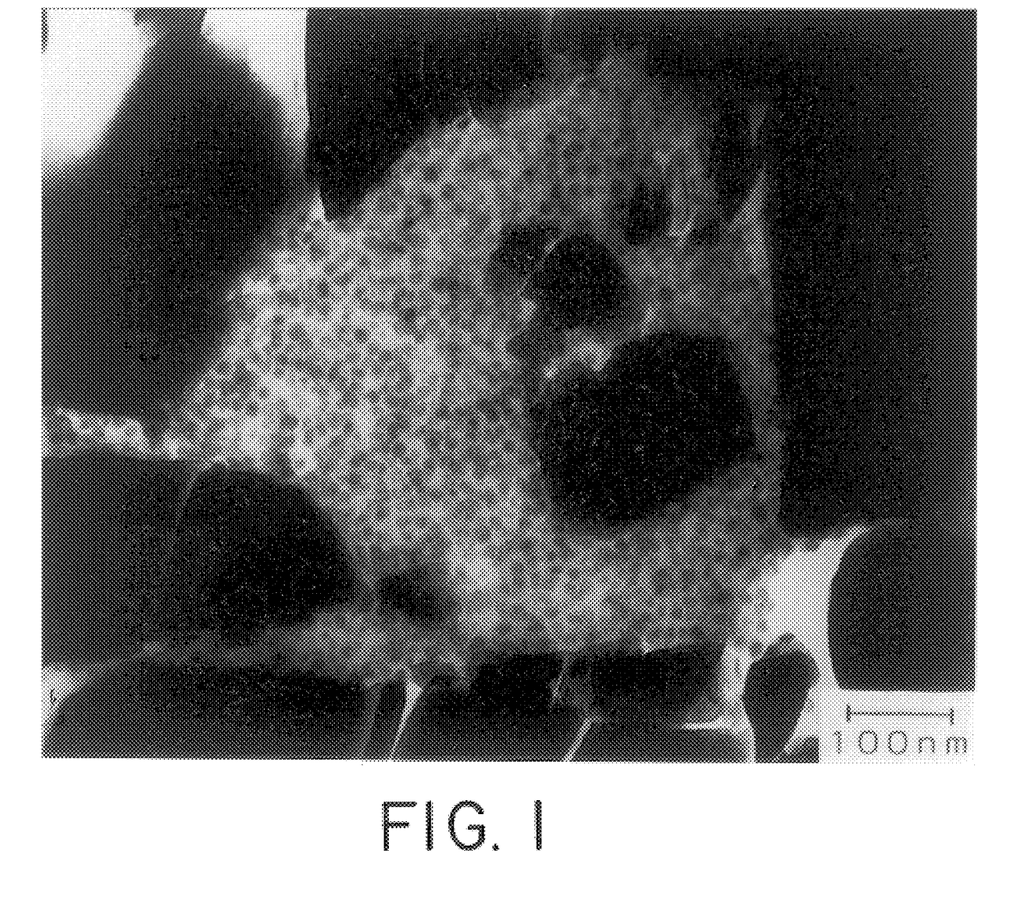
FIG. 1 is a transmission electron microscope photograph of an artificial marble of the present invention.

An extremely thin slice of the thus obtained artificial marble was observed through a transmission electron microscope, and as a result, it was confirmed that the colloidal silica was uniformly dispersed as shown in FIG. 1.

EXAMPLE 4

From 150 parts of an aqueous colloidal silica dispersion (average particle diameter=about 15 nim, silica content=

TABLE 1

| | Composition (wt%) | | Thickness of Test Piece | Temperature Time Area | Fuming Coefficient | Afterflaming Time | Flame-retardant Material |
|---|---|---|---|---|---|---|---|
| | ATH[1] | SiO$_2$[2] | (mm) | (° C. min) | (CA) | (sec) | (Success or Failure) |
| Example 1 | 60 | 21 | 5 | 0 | 0 | 0 | Success |
| Example 2 | 60 | 10 | 5 | 7.1 | 0 | 23 | Success |
| Comp. Example 1 | 60 | 0 | 5 | 154.6 | 0 | 242 | Failure |
| Comp. Example 2 | 70 | 0 | 5 | 27.3 | 0 | 42 | Failure |
| Success Standard of Flame-retardant Material[3] | | | | 350 or less | 120 or less | 30 or less | |

[1]Aluminum hydroxide
[2]Colloidal silica
[3]With regard to the appearance of the test piece after the test, a molten portion in the total thickness, cracks, deformation and the like should not be present.

EXAMPLE 3

In a glass flask equipped with stirring blades were placed 17 parts of y-methacryloyloxypropyltrimethoxysilane and 240 parts of colloidal silica-dispersing isopropyl alcohol (average particle diameter=about 15 nm, silica content=30% by weight, trade name OSCAL-1432, made by Catalytic Chemical Industry Co., Ltd.), and 6.5 parts of deionized 20% by weight, trade name Snowtex-O, made by Nissan Chemical Industries, Ltd.), volatiles were distilled off at 40° C. under reduced pressure by a rotary evaporator, while isopropyl alcohol was added at the same rate as in the distillation of the volatiles, and finally, the dispersing medium was completely replaced with isopropyl alcohol to bring the total amount into 100 parts. In the thus obtained colloidal silica-dispersing isopropyl alcohol solution, the colloidal silica was uniformly dispersed in the state of the substantially primary particles in isopropyl alcohol, so that the dispersion was a transparent gluey solution whose viscosity scarcely rose. Furthermore, this dispersion was burnt in a crucible, and on the basis of the resulting ash, a silica content was then calculated and it was 30% by weight.

Afterward, the same procedure as in Example 2 was carried out except that the thus obtained colloidal silica-dispersing isopropyl alcohol solution was used, thereby molding an artificial marble. In the thus obtained artificial marble, 10% by weight of a silica solid and 60% by weight of ATH were blended, but as in Example 2, the artificial marble was excellent in both of transparent feeling and depth, and it assumed a beautiful surface appearance, which meant that it was excellent in aesthetic properties. In addition, an oxygen index of the artificial marble was 51, which meant that the artificial marble was excellent in flame retardancy.

EXAMPLE 5

In a glass flask were placed 200 parts of the same colloidal silica-dispersing isopropyl alcohol as used in Example 1 and 20 parts of 2-hydroxyethyl methacrylate (hereinafter abbreviated to "HEMA"), and while volatiles were distilled off at 40° C. under reduced pressure by a rotary evaporator, MMA was added at the same rate as in the distillation of the volatiles, and finally, the dispersing medium was completely replaced with the mixed solution of MMA and HEMA to bring the total amount into 120 parts. In the thus obtained colloidal silica dispersion, colloidal silica was uniformly dispersed in the state of the substantially primary particles in the mixed solution of MMA and HEMA, so that the colloidal silica dispersion was transparent and its viscosity scarcely rose. Furthermore, this dispersion was burnt in a crucible, and on the basis of the resulting ash, a silica content was then calculated and it was 50% by weight.

Afterward, the same procedure as in Example 1 was carried out except that the thus obtained colloidal silica dispersion was used in place of a surface modified colloidal silica-dispersing MMA solution, thereby molding an artificial marble. This artificial marble was excellent in both of transparent feeling and depth, and it assumed a beautiful surface appearance as in Example 1, which meant that it was excellent in aesthetic properties. In addition, an oxygen index of the artificial marble was 90 or more (which was more than a measurable upper limit), which meant that the artificial marble was excellent in flame retardancy.

Comparative Example 1

40 parts of an MMA syrup preliminarily polymerized up to a polymerization ratio of 20% and 0.2 part of AVN were dissolved in 40 parts of MMA, and 120 parts of ATH (average particle diameter=44 μm, trade name BW-33, made by Nippon Light Metal Co., Ltd.) was added and then mixed by a stirrer to prepare a casting material. The thus prepared casting material was molded, polymerized and cured by the same procedures as in Example 1 to obtain an artificial marble. In the thus obtained artificial marble, 60% by weight of ATH was blended, but the artificial marble was excellent in both of transparent feeling and depth, and it assumed a beautiful surface appearance, which meant that it was excellent in aesthetic properties. However, an oxygen index of the artificial marble was as low as 31. According to a flame retardancy test procedure (a surface test) of No. 1231 (flame-retardant materials) notified by Ministry of Construction in Japan, the test results in Table 1 were obtained.

Comparative Example 2

A casting material comprising 55 parts of MMA, 5 parts of an MMA syrup preliminarily polymerized up to a polymerization ratio of 20%, 0.2 part of AVN and 140 parts of ATH was prepared by the same procedures as in Comparative Example 1. The thus prepared casting material was molded, polymerized and cured to obtain an artificial marble. In the thus obtained artificial marble, 70% by weight of ATH was blended, but the artificial marble was excellent in both of transparent feeling and depth. However, an oxygen index of the artificial marble was as low as 42. Furthermore, according to a flame retardancy test procedure (a surface test) of No. 1231 (flame-retardant materials) notified by Ministry of Construction in Japan, the test results in Table 1 were obtained.

Comparative Example 3

0.2 part of AVN was dissolved in 75 parts of MMA, and 25 parts of hydrophobic silica (average particle diameter=16 nm, trade name R-972, made by Nippon Aerosil Co., Ltd.) was added and then mixed by a stirrer to obtain a silica dispersion. In the thus obtained dispersion, hydrophobic silica cohered in MMA, so that the dispersion was opaque and a viscosity of the dispersion was higher as compared with that of any colloidal dispersion in Examples 1 to 5.

Next, it was attempted that, to 100 parts of this dispersion, 150 parts of ATH (average particle diameter=44 μm, trade name BW-33, made by Nippon Light Metal Co., Ltd.) was added and then mixed by a stirrer in order to prepare a casting material. However, a viscosity of the dispersion is too high, so that it could not be poured into a cell.

Comparative Example 4

0.2 part of AVN, 150 parts of ATH (average particle diameter=44 μm, trade name BW-33, made by Nippon Light Metal Co., Ltd.) and 25 parts of a glass fiber filler having a length of 3 mm were added to 75 parts of MMA, and they were mixed by a stirrer to prepare a casting material. In this casting material, 10% by weight of a glass fiber content and 60% by weight of ATH were blended.

Next, the thus prepared casting material was molded, polymerized and cured in the same manner as in Example 1 to obtain an artificial marble. An oxygen index of the obtained artificial marble was as high as 50, but the transparent feeling of its appearance was noticeably poor, and the excellent aesthetic properties peculiar to the artificial marble were lost.

Comparative Example 5

0.2 part of AVN was dissolved in 90 parts of MMA, and 10 parts of hydrophobic silica (average particle diameter=16 nm, trade name R-972, made by Nippon Aerosil Co., Ltd.) was added and then mixed by a stirrer to obtain a silica dispersion. In the thus obtained dispersion, hydrophobic silica cohered in MMA, so that the dispersion was opaque and the viscosity of the dispersion was higher as compared with that of any colloidal dispersion in Examples 1 to 5.

Figure 2:
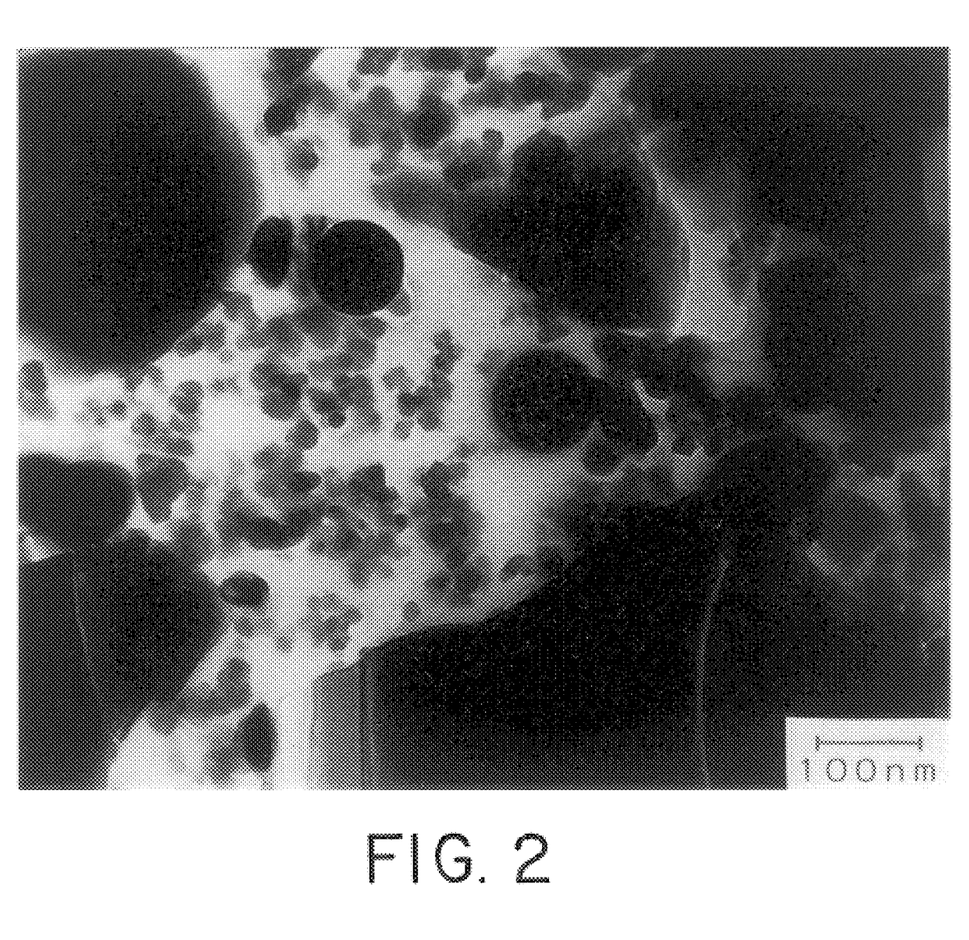
FIG. 2 is a transmission electron microscope photograph of an artificial marble obtained by a conventional technology.

Next, to 100 parts of this dispersion, 100 parts of ATH (average particle diameter=44 μm, trade name BW-33, made by Nippon Light Metal Co., Ltd.) was added and then mixed by a stirrer to prepare a casting material. In this casting material, 5% by weight of a silica content and 50% by weight of ATH were blended. The viscosity of the prepared casting material was very high, but the casting material could be molded, polymerized and cured in the same manner as in Example 1 to obtain an artificial marble. An oxygen index of the obtained artificial marble was as low as 35, and the transparent feeling of its appearance was noticeably poor, and the excellent aesthetic properties peculiar to the artificial marble were lost. An extremely thin slice of this artificial marble was observed through a transmission electron microscope, and as a result, it was confirmed that hydrophobic silica remained in a coherent state and it was not uniformly dispersed as shown in FIG. 2.

EXAMPLE 6

In a glass flask equipped with stirring blades were placed 15 parts of trimethylmethoxysilane, 200 parts of the same colloidal silica-dispersing isopropyl alcohol as used in Example 1 and 10 parts of a 0.1 N aqueous hydrochloric acid solution, and the solution was then heated up to 50° C. After 2 hours, while volatiles were distilled off at 40° C. under reduced pressure by a rotary evaporator, styrene was added at the same rate as in the distillation of the volatiles, and finally, the dispersing medium was completely replaced with styrene to bring the total amount into 120 parts. In the thus obtained colloidal silica dispersion, surface modified colloidal silica was uniformly dispersed in the state of the substantially primary particles in styrene, so that the colloidal silica dispersion was transparent and its viscosity scarcely rose. Furthermore, this dispersion was burnt in a crucible, and on the basis of the resulting ash, a silica content was then calculated and it was 57% by weight.

To 100 parts of this dispersion were added newly 30 parts of styrene, 70 parts of an unsaturated polyester prepolymer (terephthalic acid-based unsaturated polyester, trade name Yupica 6424, made by Nippon Yupica Co., Ltd.), 2.5 parts of benzoyl peroxide and 300 parts of ATH (average particle diameter=44 μm, trade name BW-33, made by Nippon Light Metal Co., Ltd.), and they were mixed by a stirrer to prepare a casting material. In this casting material, 11% by weight of a silica solid and 60% by weight of ATH were blended.

The thus prepared casting material was molded in the same manner as in Example 1 to obtain a desired artificial marble. In this case, polymerization and curing were carried out at 70° C. for 1.5 hours and at 150° C. for 4 hours. The obtained artificial marble assumed a beautiful surface appearance, which meant that it was excellent in aesthetic properties. In addition, an oxygen index of the artificial marble was 50, which meant that the artificial marble was excellent in flame retardancy.

EXAMPLE 7

The same procedure as in Example 2 was conducted except that magnesium hydroxide (average particle diameter=20 μm, high-purity magnesium hydroxide, made by Asahi Glass Co., Ltd.) was used as an inorganic filler (B), thereby molding an artificial marble. In the obtained artificial marble, 10% by weight of a silica solid and 60% by weight of magnesium hydroxide were blended, but the artificial marble exhibited good aesthetic properties and had an oxygen index of 57, which meant that the artificial marble was very excellent in flame retardancy.

EXAMPLE 8

The same procedure as in Example 4 was conducted except that a 30% by weight isopropanol dispersion prepared by the use of an aqueous colloidal antimony pentoxide dispersion (average particle diameter=40 nm, antimony pentoxide content=50% by weight, trade name A-2550, made by Nissan Chemical Industries, Ltd.) was used as an colloidal metal oxide (C), thereby molding an artificial marble. In the thus obtained artificial marble, 10% by weight of an antimony pentoxide solid and 60% by weight of ATH were blended, but the artificial marble exhibited good aesthetic properties and had an oxygen index of 56, which meant that the artificial marble was very excellent in flame retardancy.

EXAMPLE 9

The same procedure as in Example 4 was conducted except that an aqueous colloidal alumina dispersion (average particle diameter=15 nm, alumina content=20% by weight, trade name Aluminasol-520, made by Nissan Chemical Industries, Ltd.) was used as an colloidal metal oxide (C), thereby molding an artificial marble. In the thus obtained artificial marble, 10% by weight of an alumina solid and 60% by weight of ATH were blended, but the artificial marble exhibited good aesthetic properties and had an oxygen index of 53, which meant that the artificial marble was excellent in flame retardancy.

EXAMPLE 10

The same procedure as in Example 1 was conducted except that 30 parts of vinyl chloride-vinylidene chloride copolymer (trade name Kurehalon SPX 105, made by Kureha Chemical Industry Co., Ltd., vinyl chloride content= 76.6% by weight), 70 parts of MMA, 0.5 part of AVN and 300 parts of ATH were added to 100 parts of a 52% by weight surface modified colloidal silica-dispersing MMA solution obtained in the same manner as in Example 1, thereby molding an artificial marble. In the thus obtained artificial marble, 10% by weight of a silica solid and 60% by weight of ATH were blended, but the artificial marble was excellent in both of transparent feeling and depth, and it assumed a beautiful surface appearance, which meant that it was excellent in aesthetic properties. In addition, an oxygen index of the artificial marble was 61, which meant that the artificial marble was very excellent in flame retardancy.

EXAMPLE 11

The same procedure as in Example 10 was conducted except that a 52% by weight surface modified colloidal antimony pentoxide-dispersing MMA solution obtained in the same manner as in Example 8 was used in place of a colloidal silica-dispersing MMA solution, thereby molding an artificial marble. In the thus obtained artificial marble, 10% by weight of an antimony pentoxide solid and 60% by weight of ATH were blended, but the artificial marble exhibited good aesthetic properties and had an oxygen index of 68, which meant that the artificial marble was very excellent in flame retardancy.

EXAMPLE 12

The same procedure as in Example 1 was conducted except that 30 parts of acrylonitrile-styrene copolymer (trade name Sebian N 020SF, made by Daisel Ltd.), 70 parts of utA, 0.5 part of AVN and 300 parts of ATH were added to 100 parts of a 52% by weight surface modified colloidal silica-dispersing MMA solution obtained in the same manner as in Example 1, thereby molding an artificial marble. In the thus obtained artificial marble, 10% by weight of a silica solid and 60% by weight of ATH were blended, but the artificial marble was excellent in both of transparent feeling and depth, which meant that it was excellent in aesthetic properties. In addition, an oxygen index of the artificial marble was 57, which meant that the artificial marble had a very high flame retardancy.

EXAMPLE 13

5 parts of an MMA syrup preliminarily polymerized up to a polymerization ratio of 20%, 70 parts of styrene and 25 parts of 2-ethylhexyl methacrylate were added to 100 parts of a 52% by weight surface modified colloidal silica-dispersing MMA solution obtained in the same manner as in Example 1, and they were then mixed by a stirrer to prepare a 26% by weight surface modified colloidal silica dispersion. A refractive index at room temperature of a solidified substance of this dispersion was 1.53.

Next, 60 parts of ATH and 0.1 part of AVN were added to 40 parts of the thus obtained 26% by weight surface modified colloidal silica dispersion, and they were then mixed by a stirrer to prepare a casting material. In this casting material, 10% by weight of a silica solid and 60% by weight of ATH were blended.

The thus prepared casting material was molded in the same manner as in Example 1 to obtain a desired artificial marble. This obtained artificial marble had a light yellow onyx-like transparent feeling, which meant that it was very excellent in aesthetic properties. In addition, an oxygen index of the artificial marble was 53, which meant that the artificial marble maintained a very high flame retardancy.

EXAMPLE 14

30 parts of trimethylolpropane trimethacrylate and 70 parts of polystyrene (trade name Esbright T-2 beads, made by Sumitomo Chemical Co., Ltd.) were added to 100 parts of a 57% by weight surface modified colloidal silica-dispersing styrene solution obtained in the same manner as in Example 6, and they were then mixed by a stirrer to prepare a 29% by weight surface modified colloidal silica-dispersing viscous polymerizable syrup. A refractive index at room temperature of a solidified substance of this syrup was 1.55.

Next, 60 parts of ATH (average particle diameter=44 $\mu$m, trade name BW-33, made by Nippon Light Metal Co., Ltd.), 0.2 part of t-butyl peroxyoctoate, 0.9 part of zinc stearate and 0.2 part of $\gamma$-methacryloyloxypropyltrimethoxysilane were added to 40 parts of the thus obtained 29% by weight surface modified colloidal silica dispersing syrup, and the mixture was thrown into a twin-arm type kneader and then stirred to obtain a high-viscosity clay-like molding material having good handling properties. In this molding material, 12% by weight of a silica solid and 60% by weight of ATH were blended.

The thus prepared molding material was thrown into a plate mold (temperature=120° C.) set on a pressure molding machine, and then subjected to pressure molding under a molding pressure of 60 kg/cm$^2$ for a molding time of 5 minutes. In consequence, an artificial marble which was excellent in transparent feeling and free from cracks and strain and which had an onyx-like appearance could be obtained, and an oxygen index of the artificial marble was 53, which meant that the artificial marble was excellent in flame retardancy.

EXAMPLE 15

66 parts of an MMA syrup preliminarily polymerized up to a polymerization ratio of 10%, 34 parts of neopentyl glycol dimethacrylate, 0.0045 part of 2,2'-azobis(4-methoxy-2,4-dimethylvaleronitrile), 0.45 part of di-t-butyl peroxide, 0.15 part of 2,2-bis(t-butylperoxy)butane, 0.075 part of di-t-butyl peroxyhexahydroterephthalate and 1.5 parts of formic acid were added to 100 parts of a 52% by weight surface modified colloidal silica-dispersing MMA solution obtained in the same manner as in Example 1 to prepare a mixed solution. In this mixed solution, a polymer content was 4.5% by weight (based on a resin content).

This mixed solution was poured into a cell formed by two glass plates so that a space therebetween might be 10 mm, and prepolymerization was then carried out at 50° C. for 3 hours to obtain a partially crosslinked gel-like polymer having a polymer content of 30.6% by weight (based on a resin content).

Next, 60 parts of ATH (average particle diameter=44 $\mu$m, trade name BW-33, made by Nippon Light Metal Co., Ltd.) was added to 40 parts of this partially crosslinked gel-like polymer, and they were then mixed and kneaded at room temperature for 30 minutes by a pressure kneader to obtain a molding material filled with an inorganic filler. In this molding material, 10% by weight of a silica solid and 60% by weight of ATH were blended.

The thus prepared molding material was pressed in a plate mold at a mold temperature of 130° C. under an initial pressure of 20 kg/cm$^2$ for 0.5 minute and then under an increased pressure of 150 kg/cm$^2$ for 14.5 minutes. In consequence, an artificial marble was obtained which was not colored yellow or the like and was excellent in both of transparent feeling and depth and which assumed a beautiful surface appearance. In addition, an oxygen index of the artificial marble was 53, which meant that the artificial marble was excellent in flame retardancy.

EXAMPLE 16

The same procedure as in Example 1 was conducted except that 50 parts of MMA, 25 parts of an MMA syrup preliminarily polymerized up to a polymerization ratio of 20%, 25 parts of a halogen-containing condensed phosphate (trade name CR509, made by Daihachi Chemical Industry Co., Ltd., phosphorus content 13.5% by weight or more, halogen content=24.0% by weight or more), 0.5 part of AVN and 300 parts of ATH were added to 100 parts of a 52% by weight surface modified colloidal silica-dispersing MMA solution obtained in the same manner as in Example 1, thereby molding an artificial marble. In the thus obtained artificial marble, 10% by weight of a silica solid and 60% by weight of ATH were blended, but the artificial marble was excellent in aesthetic properties. In addition, an oxygen index of the artificial marble was 60, which meant that the artificial marble was very excellent in flame retardancy.

EXAMPLE 17

0.01 part of an iron oxide pigment dispersion, which was prepared by stirringmixing 40 parts of a fine yellow pigment (a ferric hydroxide pigment having an $Fe_2O_3$ content of about 82.5% by weight) and 10 parts of a black iron oxide pigment (containing 98% by weight of $Fe_3O_4$) with 50 parts of a soybean oil epoxide resin, was added to 100 parts of a casting material obtained in the same manner as in Example 2, and the resulting mixture as the casting material was then treated by the same procedure as in Example 2 to mold an artificial marble. In the thus obtained artificial marble, 10% by weight of a silica solid and 60% by weight of ATH were blended, but the artificial marble had a good appearance, i.e., it was semitransparent and had a uniform light almond color. In addition, an oxygen index of the artificial marble was 51, which meant that the artificial marble was excellent in flame retardancy.

EXAMPLE 18

0.2 part of a yellow nylon flock having a length of 1.3 mm and a fineness of 2 denier (which was dyed with a yellow dyeing solution having a dye concentration of 3% by weight) was added to 100 parts of a casting material obtained in the same manner as in Example 1, and the resulting mixture as the casting material was then treated by the same procedure as in Example 2 to mold an artificial marble. In the thus obtained artificial marble, 10% by weight of a silica solid and 60% by weight of ATH were blended, but the artificial marble had a good appearance, i.e., it was semitransparent and had a uniform yellow color. In addition, an oxygen index of the artificial marble was 52, which meant that the artificial marble was excellent in flame retardancy.

EXAMPLE 19

One part of active carbon (apparent specific gravity=0.4) which was passed through 500 μm and was on 350 μm of a JIS standard sieve was added to 100 parts of a casting material obtained in the same manner as in Example 2, and the resulting mixture as the casting material was then treated by the same procedure as in Example 2 to mold an artificial marble. In the thus obtained artificial marble, 10% by weight of a silica solid and 60% by weight of ATH were blended, but the artificial marble had a good appearance which was similar to granite having a uniform black spot pattern. In addition, an oxygen index of the artificial marble was 53, which meant that the artificial marble was excellent in flame retardancy.

EXAMPLE 20

The same procedure as in Example 1 was conducted except that 50 parts of an MMA syrup preliminarily polymerized up to a polymerization ratio of 20%, 0.5 part of AVN, 250 parts of ATH and 100 parts of a mixture [which was constituted of 45% by weight of an opaque calcined talc (optical density to visible light=2.0 or more, average particle diameter=580 μm), 20% by weight of opaque magnetite (optical density to visible light=2.0 or more, average particle diameter=580 μm) and 35% by weight of semitransparent wollastonite (optical density to visible light=1.2+0.1, average particle diameter=340 μm)] were added to 100 parts of a 52% by weight surface modified colloidal silica-dispersing MMA solution obtained in the same manner as in Example 1, thereby obtaining an artificial marble. In the thus obtained artificial marble, 10% by weight of a silica solid, 50% by weight of ATH and 20% by weight of the other inorganic substances were blended, but its appearance was similar to natural granite. In addition, an oxygen index of the artificial marble was 56, which meant that the artificial marble was very excellent in flame retardancy.

EXAMPLE 21

60 parts of ATH (average particle diameter=44 μm, trade name BW-33, made by Nippon Light Metal Co., Ltd.) and 0.5 part of methyl ethyl ketone peroxide were added to 40 parts of an unsaturated polyester resin prepolymer (trade name Polymerl 3308PS, made by Takeda Chemical Industries, Ltd.), and they were then stirred. Afterward, the resulting mixture was poured into a mold, and then cured at room temperature to obtain a substantially transparent plate-like cured material. A parallel light transmittance of this plate-like cured material was measured in the form of its sheet having a thickness of 2 mm by a measurement method A in accordance with JIS K-7105, and as a result, it was 12.3%. This cured material was ground to obtain substantially transparent particles having a particle diameter of 0.5 to 3 mm.

Next, the same procedure as in Example 1 was conducted except that, to 100 parts of a 52% by weight surface modified colloidal silica-dispersing ?4MA solution obtained in the same manner as in Example 1 were added newly 50 parts of MMA, 50 parts of substantially transparent particles, 0.5 part of AVN and 300 parts of ATH, thereby obtaining an artificial marble. In the thus obtained artificial marble, 10% by weight of a silica solid and 66% by weight of ATH were blended, but its appearance was similar to natural stone. In addition, an oxygen index of the artificial marble was 65, which meant that the artificial marble was very excellent in flame retardancy.

EXAMPLE 22

10 parts of an MMA syrup preliminarily polymerized up to a polymerization ratio of 20%, 70 parts of styrene and 20 parts of cyclohexyl methacrylate were added to 100 parts of a 52% by weight surface modified colloidal silica-dispersing MMA solution obtained in the same manner as in Example 1, and they were mixed by a stirrer to prepare a 26% by weight surface modified colloidal silica dispersion. A refractive index at room temperature of a solidified substance of this dispersion was 1.53.

Next, 60 parts of ATH and 0.1 part of AVN were added to 40 parts of the thus obtained 26% by weight surface modified colloidal silica dispersion, and they were mixed by the stirrer to prepare a casting material. In this casting material, 10% by weight of a silica solid and 60% by weight of ATH were blended.

The thus prepared casting material was molded in the same manner as in Example 1 to obtain a desired artificial marble. This obtained artificial marble had a light yellow onyx-like transparent feeling, which meant that it was very excellent in aesthetic properties. In addition, an oxygen index of the artificial marble was 53, which meant that the artificial marble maintained a very high flame retardancy.

As described above, in the present invention, a colloidal metal oxide having an average particle diameter of 1 to 100 nm can be stably uniformly dispersed in the state of substantially primary particles in a polymer without cohering, and therefor, even if blended with the polymer, the metal oxide can easily be filled in a high ratio without increasing the viscosity of the system. Even when the metal oxide is filled in a high ratio in such way, an obtained artificial marble can hold a very high flame retardancy, maintaining transparent feeling without impairing aesthetic properties (transparent feeling, shielding properties and surface appearance) peculiar to the artificial marble.

We claim:

1. An artificial marble which comprises
   a polymer (A) of a radical polymerizable vinyl compound (a) in an amount of 15 to 50% by weight,
   aluminim hydroxide (B) having an average particle diameter of 1 μm or more in an amount of 45 to 75% by weight, and
   at least one colloidal material (C)selected from the group consisting of colloidal silica, colloidal antimony oxide and colloidal alumina and having an average particle diameter of 1 to 100 nm in an amount of 5 to 30% by weight based on the total weight of the artificial marble,
   wherein the colloidal material (C) is uniformly dispersed in the state of substantially primary particles in the polymer (A).

2. The artificial marble according to claim 1 wherein the polymer (A) contains a polymer obtained by polymerizing at least one compound selected from methacrylic acid esters, the amount of the polymer being 50% by weight or more based on the total weight of the polymer (A).

3. The artificial marble according to claim 1 wherein the polymer (A) comprises vinyl chloride-vinylidene chloride copolymer in an amount of 5 to 40% by weight and a polymer containing methyl methacrylate as a main component in an amount of 95 to 60% by weight based on the total weight of the polymer (A).

4. The artificial marble according to claim 1 wherein the polymer (A) comprises acrylonitrile-styrene copolymer in an amount of 5 to 40% by weight and a polymer containing methyl methacrylate as a main component in an amount of 95 to 60% by weight based on the total weight of the polymer (A).

5. The artificial marble according to claim 1 wherein the polymer (A) is a copolymer which comprises two or more monomers selected from the group consisting of cyclohexyl methacrylate, methyl methacrylate, 2-ethylhexyl methacrylate and styrene and whose refractive index is in the range of 1.51 to 1.55 at room temperature.

6. The artificial marble according to claim 1 wherein the polymer (A) is a polymer obtained by polymerizing a mixture which comprises (i) 65 to 45% by weight of a monomer mixture comprising 30 to 80% by weight of an aliphatic polyfunctional methacrylate and 70 to 20% by weight of an aromatic compound having an ethylenic unsaturated bond in a molecule, and (ii) 35 to 55% by weight of an aromatic compound polymer having an ethylenic unsaturated bond in a molecule and whose refractive index is in the range of 1.55 to 1.57 at room temperature.

7. The artificial marble according to claim 1 wherein the colloidal material (C) is at least one selected from the group consisting of colloidal silica, colloidal antimony oxide and colloidal alumina.

8. The artificial marble according to claim 1 wherein the total of the inorganic filler (B) and the metal oxide (C) is in the range of 50 to 85% by weight based on the total weight of the artificial marble and a weight ratio of (B)/(C) is in the range of 1.5 to 15, and the polymer (A) contains a polymer obtained by polymerizing at least one compound selected from the methacrylic acid esters, the amount of the contained polymer being 50% by weight or more based on the total weight of the polymer (A).

9. The artificial marble according to claim 1 wherein an oxygen index of the artificial marble measured by a procedure described in JIS K-7201 is 45 or more.

10. The artificial marble according to claim 1 which further contains at least one flame retardant (D) selected from the group consisting of chlorine-containing flame retardants, bromine-containing flame retardants, phosphorus containing flame retardants and inorganic flame retardants.

11. The artificial marble according to claim 1 which further contains an iron oxide pigment (E) having an average particle diameter of 10 μm or less.

12. The artificial marble according to claim 1 which further contains a short colored fiber (F) having a length of 0.2 to 13 mm and a fineness of 1 to 300 denier.

13. The artificial marble according to claim 1 which further contains a carbon particles (G).

14. The artificial marble according to claim 1 which further contains an opaque particles (H) in which a shortest length is 200 μm or more and an optical density to visible light is 2.0 or more, and at least one kind of particles (I) selected from the group consisting of semitransparent particles and transparent particles in which a shortest length is 200 μm or more and an optical density to visible light is in the range of 2.0 or less.

15. The artificial marble according to claim 1 which further contains substantially transparent particles (J) comprising 15 to 60% by weight of a resin composition and 85 to 40% by weight of an inorganic filler, and having a particle diameter of 0.2 to 5 mm.

16. A method for preparing an artificial marble which comprises the steps of hydrolyzing and polycondensing at least one silane compound (K) represented by the following formula (i) in a dispersion comprising at least one colloidal material (C) selected from the group consisting of colloidal silica, colloidal antimony oxide and colloidal alumina and having an average particle diameter of 1 to 100 nm, in an amount of from 5 to 30% by weight based on the total weight of the artificial marble, and a dispersing medium to modify the surfaces of the colloidal material (C), replacing the dispersing medium with a radical polymerizable vinyl compound (a) in an amount of from 15 to 50% by weight, further adding aluminum hydroxide (B) in an amount of from 45 to 75% by weight, and then polymerizing and curing the radical polymerizable vinyl compound (a):

$$SiR^1_aR^2_b(OR^3)_c \tag{i}$$

wherein $R^1$ and $R^2$ each is a hydrocarbon group having 1 to 10 carbon atoms which may have an ether linkage, an ester linkage, an amino group, a mercapto group, a halogen atom or a carbon-carbon double bond; $R^3$ is a hydrogen atom or a hydrocarbon group having 1 to 10 carbon atoms which may have an ether linkage, an ester linkage or a carbon-carbon double bond; a and b each is an integer of 0 to 3; and c is 4-a-b and an integer of 1 to 4.

17. A method for preparing an artificial marble which comprises the steps of replacing a dispersing medium in a dispersion comprising at least one colloidal material (C) selected from the group consisting of colloidal silica, colloidal antimony oxide and colloidal alumina and having an average particle diameter of 1 to 1000 nm, in an amount of from 5 to 30% by weight based on the total weight of the artificial marble, and a dispersing medium with a radical polymerizable vinyl compound (a) in an amount of from 15 to 50% by weight, containing at least one member selected from the group consisting of a radical polymerizable vinyl compound having one or more hydroxy groups in its molecule and a radical polymerizable vinyl compound having one or more epoxy groups capable of generating the hydroxy groups in its molecule, adding aluminum hydroxide in an amount of from 45 to 75% by weight, and then polymerizing and curing the radical polymerizable vinyl compound (a).

* * * * *